United States Patent

Rush et al.

[11] 3,719,209
[45] March 6, 1973

[54] ARCUATE TUBULAR ARTICLES OF RIGID PLASTIC

[75] Inventors: Clifford W. Rush, Southington; Peter T. Schurman, Woodbridge, both of Conn.

[73] Assignee: The Beaton & Corbin Manufacturing Company, Southington, Conn.

[22] Filed: Sept. 23, 1970

[21] Appl. No.: 74,699

[52] U.S. Cl. ...................138/177, 4/191, 138/178, 285/179, 285/423
[51] Int. Cl. ...................................F16l 9/12
[58] Field of Search ..138/177, 178; 4/166, 187, 188, 4/191; 285/179, 423

[56] References Cited

UNITED STATES PATENTS 3,470,900  10/1969  Rothauser...........................285/423

*Primary Examiner*—Houston S. Bell, Jr.
*Attorney*—Steward & Steward and Donald T. Steward

[57] ABSTRACT

An improved method is disclosed for fabricating a rigid plastic tubular article having an integral arcuate portion along its tubular axis. Articles such as plumbing traps, waste bends, etc., manufactured by the method are also disclosed.

6 Claims, 11 Drawing Figures

PATENTED MAR 6 1973 3,719,209

INVENTORS
CLIFFORD W. RUSH
PETER T. SCHURMAN
BY *Steward & Steward*
ATTORNEYS

FIG. 6
FIG. 7
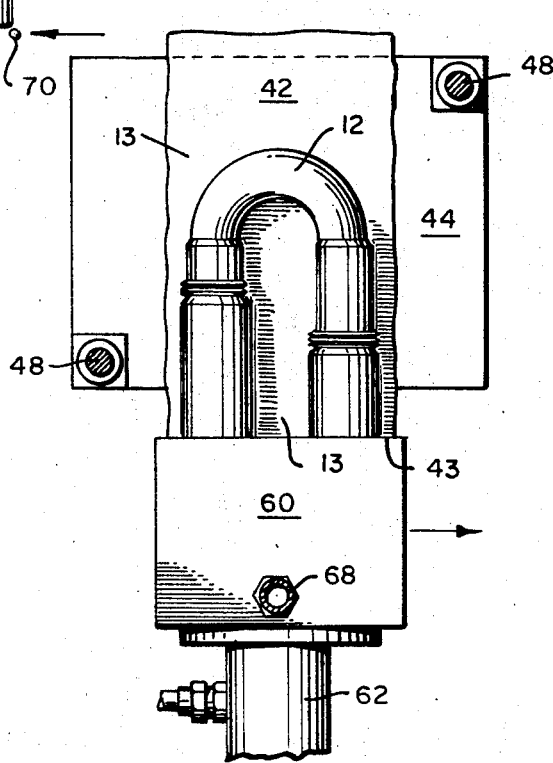
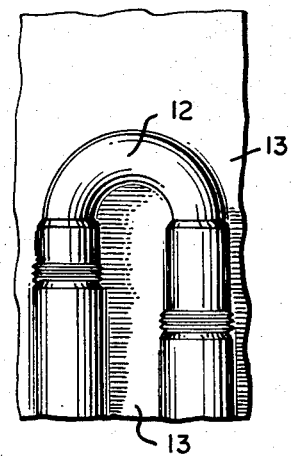
FIG. 8
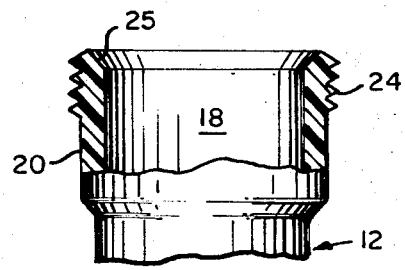
FIG. 9
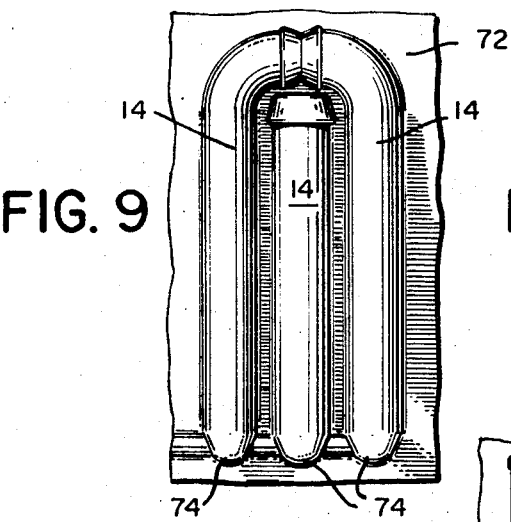
FIG. 10
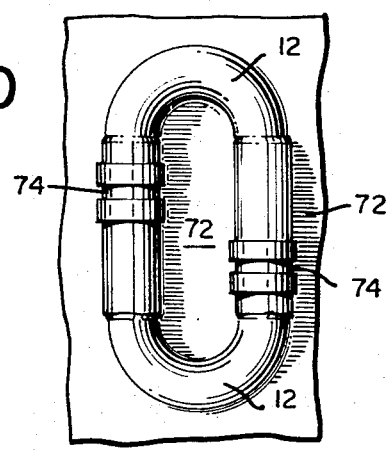
FIG. 11
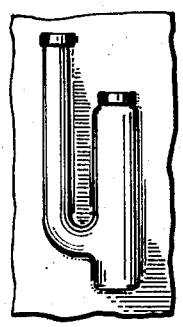

ARCUATE TUBULAR ARTICLES OF RIGID PLASTIC

This invention relates to an improved, commercially practical method of making rigid tubular articles of thermoplastic resins where the articles have an integral curve or bend along the longitudinal axis of the tube and especially where the curve or bend leads into a straight section, a curved section of different radius of curvature or other tubular configuration which does not permit use of a readily removable core in the molding of the tubular article. The invention finds particular utility in the fabrication of plumbing traps and related bent tubular accessories, and utilizes plastic molding techniques in a novel way to greatly simplify the production of such parts.

Plastic components are coming into increasing use in plumbing systems to replace equivalent metal parts. The plastic components offer certain advantage over the metal fittings, especially in respect to corrosion resistance and potentially lower material and production costs. However, with the exception of semi-flexible plastic pipe which readily lends itself to extrusion molding, the manufacture of tubular plastic plumbing components has until now been limited practically to those items which can be injection molded, such as elbows and tees where the end openings are relataively close-coupled to the bend section of the tubular component, or the tubular configuration is otherwise such that the required core for forming the hollow interior of the part can be readily withdrawn after the plastic has been rigidified. Tubular parts having an integral arcuate bend connecting into a straight section along the tubular axis, as in the case of plumbing traps, waste bends and related accessories, are especially difficult to produce by injection molding procedures. Obviously the core used in forming the interior wall must be removed from the finished article, yet the bend causes the core to become locked into the finished product. In order to overcome this difficulty, attempts have been made to divide the core into several sections, as shown in U.S. Pat. Nos. 3,028,630 and 3,200,023. Articulated cores comprising a series of flexibily connected segments have also been proposed. However unless the arcuate portion of the core is segmented into many parts of individually limited arcuate extent, the removal of the core subsequent to the injection molding operation still requires a capability in the finished product for at least some temporary distortion to permit release of the core segments. This inherently limits the selection of the plastic resin, and/or the design of the fitting, to accommodate such distortion. Alternate proposals have also been advanced in which highly elastomeric plastics have been deliberately selected for the material of which the part is formed. This permits greater freedom of mechanical design in the part, as well as in the core, since the molded part can be substantially distorted to permit removal of more complex types of cores. But of course the finished product remains elastic and non-rigid and this is undesirable since it complicates the matter of forming gas and liquid-tight connection to adjacent piping, etc. Examples of highly flexible molded fittings are shown in U.S. Pat. Nos. 1,536,700 and 2,484,031.

The present invention provides a new approach to the production of tubular parts of rigid plastic having an elongated or extended arcuate section integrally formed intermediate the ends of the finished part. The problems attendant upon the use of a core which have plagued previous attempts at molding such articles are eliminated by the adaptation and resort to blow molding techniques in carrying out the invention. In the novel method of fabricating bent tubular parts here disclosed, a split die is provided having a mold cavity in each half configured to the outer shape of the arcuate tubular article. The split of the die is made to coincide with the medial axial plane in which the arcuate portion of the tubular article lies. With the mating die parts initially in spaced position, a tubular parison of heated thermoplastic resin is extruded from an extruder head to hang downwardly and be flanked by the separated die members. Simultaneously therewith, or subsequently, an inflation needle or blow pipe is introduced into the mold cavity, interiorly of the parison, and pneumatic pressure is supplied when the die is closed, causing the parison wall to expand outwardly against the surface of the mold cavity while the plastic resin is still in formable condition. Preferably, the parison is then severed above the closed die to allow the later to be moved transversely to a cooling and ejection station where the molded part is stripped upon opening the die after the plastic is sufficiently hardened to permit handling. Meanwhile the extrusion of the parison continues uninterruptedly and after the component is stripped from the open die, the latter is returned while still in open condition to its starting position to again flank the parison, whereupon the cycle is repeated. After stripping the molded part from the die, the excess plastic flashing is broken or cut away, leaving the finished product.

This method of production lends itself readily to molding thread sections integrally into the part, as well as sections having different wall thicknesses in certain areas along the axis of the tube. The molded plastic components can thus be formed to be dimensionally and mechanically interchangeable in all respects with the metal counterparts, and are completely compatible for interconnection with metal pipe or fittings. Where external surface appearance is an important consideration, for example chrome finished plumbing traps, the plastic part may be plated by known techniques or the plastic polymer impregnated with metal powder to produce a surface that adequately identifies with conventional metal accessories. These and other objects and advantages are described more fully below in relation to certain specific embodiments illustrative of the practical application of this invention.

In the drawings:

FIG. 5 and 6 are views similar to that of FIG. 4, showing the equipment in subsequent stages of operation;

FIG. 7 is a plan view of the molded part prior to removal of the excess flash;

FIG. 8 is an enlarged fragmentary view in cross section of the threaded area of a finished plastic trap, taken on line 8—8 of FIG. 1;

FIG. 9 is a plan view of another molded part comprising a cluster of waste bends, prior to removal of the flash and separation of the individual bends;

FIG. 10 is a plan view of a molded product consisting of a pair of traps arranged in complementary position, produced by a modified procedure under the invention; and FIG. 11 illustrates a different type of trap which can be produced in accordance with the invention.

Figure 1:
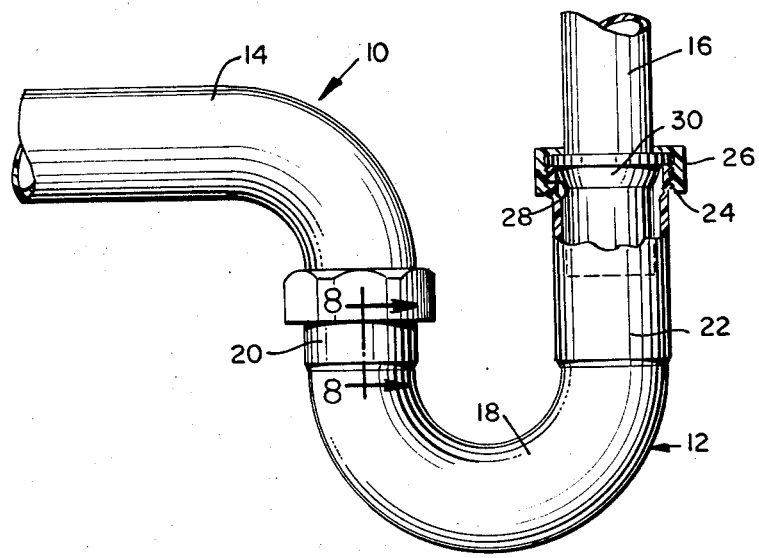
FIG. 1 is a side elevational view of a section of a plumbing waste duct installation incorporating a trap of rigid plastic produced in accordance with the invention, portions of the trap being broken away at one end and shown in section for better illustration.

There is shown specifically in FIG. 1 a short section 10 of a waste duct comprising a J-tube trap 12 connected to a waste bend 14 at one of its ends, and to an extension tube or tailpiece 16 at its opposite end. Although all three duct members could be formed of molded plastic tubing made in accordance with the present invention, as shown and described below only trap 12 and bend 14 are formed of plastic and tailpiece 16 is assumed to be of metal.

Trap 12 comprises a rigid tubular arcuate body portion 18 interconnecting straight legs or runs 20, 22. As illustrated here, each of these legs is slightly enlarged in diameter in order to telescopingly accept the respective duct members 14, 16. Each end of trap 12 is provided with external threads 24 integrally molded into the wall of the tubing, and each end is beveled internally to form an annular sealing surface 25 (See FIG. 8). A glandnut 26 internally threaded at 28 is screwed down onto trap 12 to compress an annular frustoconical gasket 30 against the sealing surface 25, forcing the gasket to grip the respective duct member 14 or 16 and provide a fluid and gas-tight joint. Nuts 26 may be either metal or plastic.

Figure 2:
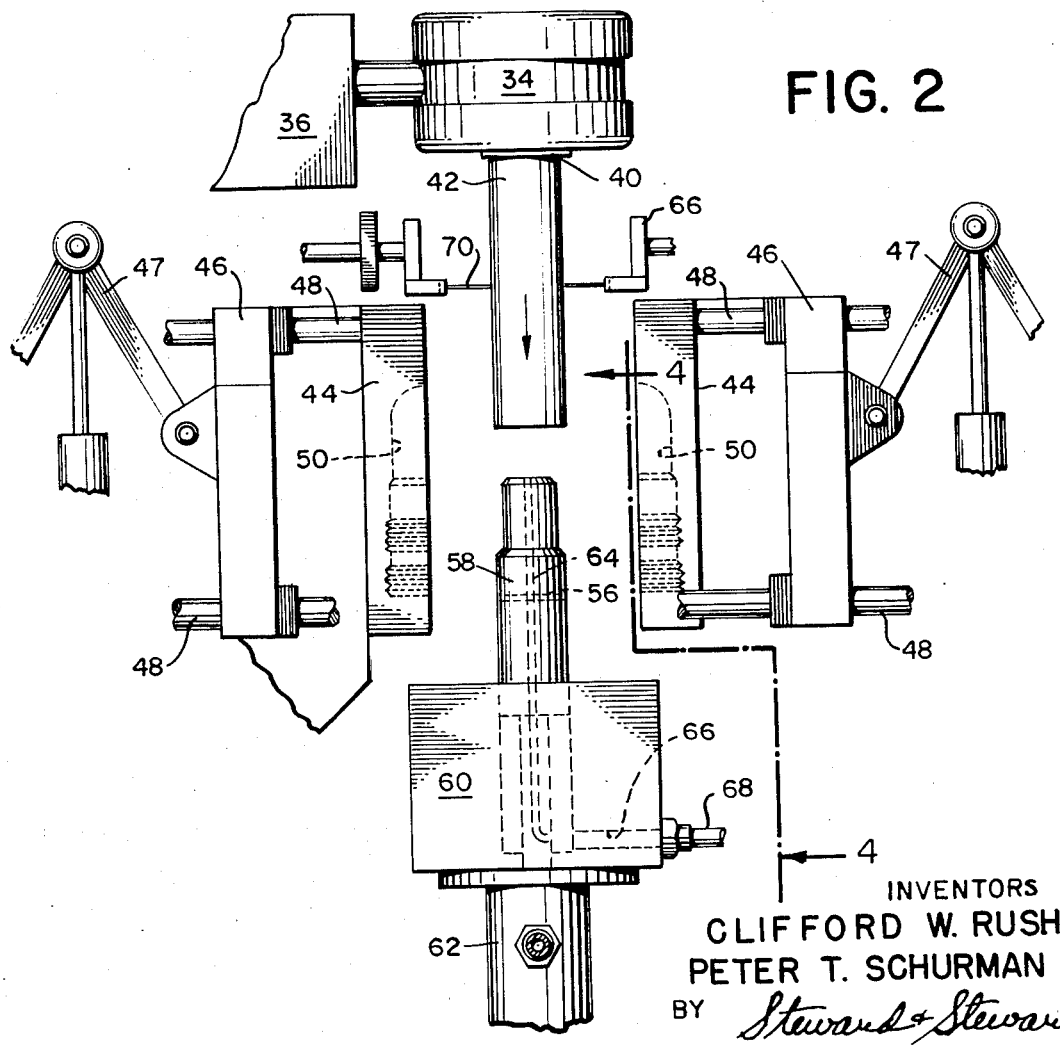
FIG. 2 is a fragmentary view in side elevation of molding equipment suitable for producing plastic articles such as the trap in FIG. 1, the die members being shown here in open position.
Figure 3:
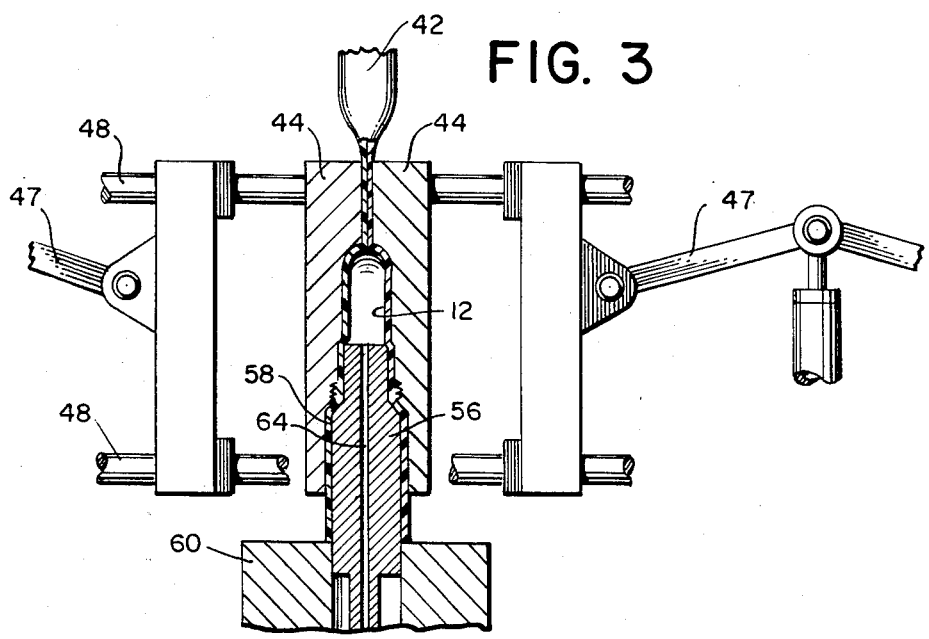
FIG. 3 is a view similar to that of FIG. 2 but showing the die members in closed position, parts being broken away and shown in section.
Figure 4:
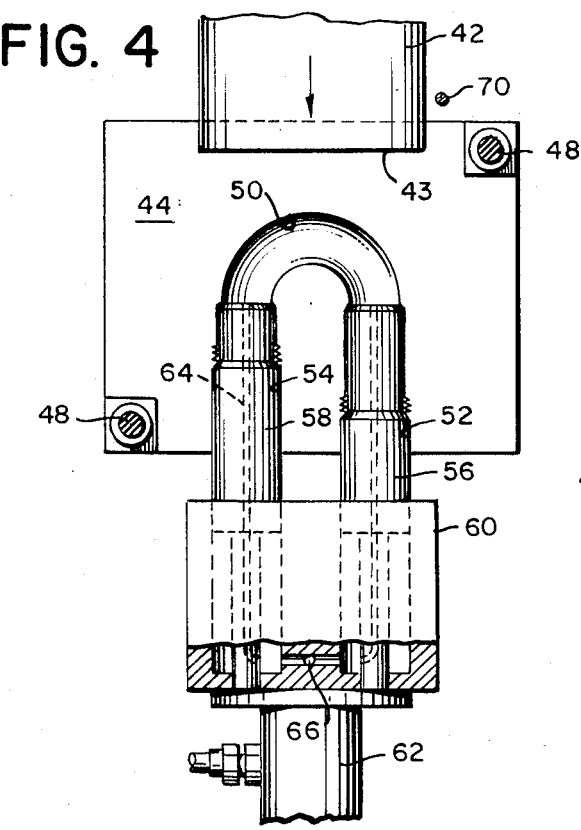
FIG. 4 is an enlarged view in end elevation taken on line 4—4 of FIG. 2.
Figure 5:
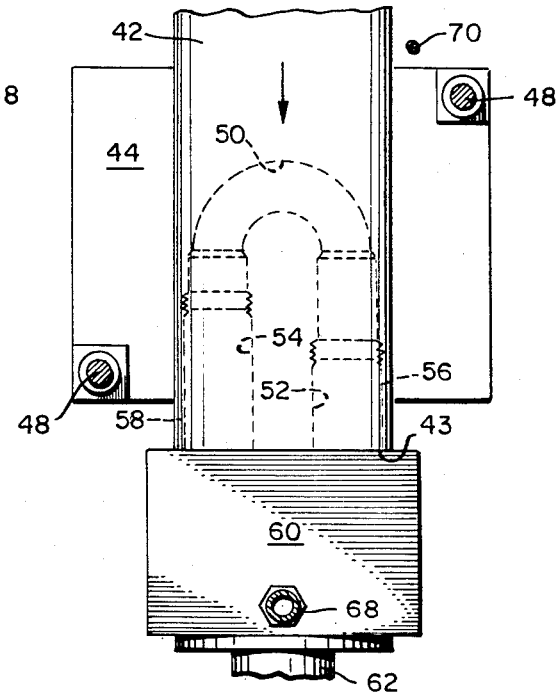

The apparatus and method employed in accordance with this invention for the production of trap 12 are illustrated in FIGS. 2 through 6. The apparatus consists of a plastic extruder of conventional type comprising an extruder head 34 communicating by means of heated feed tube 36 to a resin hopper or storage bin, not shown. Plastic resin beads, chips, etc. are introduced into the hopper and fed to head 34 by an augur in tube 36 while being heated so that the advancing resin arrives at the head in plastic or semi-fluid condition. The plastic resin is then extruded through a suitable annular die 40 in head 34 to form a pliable depending tubular thin-walled sleeve or parison 42. Parison 42 is extruded at a relatively slow but continuous rate and is received between split die members 44 carried by backing plates 46 slidably supported on rails 48 so that the mating die members 44 may be shifted from open position as shown in FIG. 2 to closed position, as in FIG. 3, in face-to-face contact to clamp the parison between them. Each of die members 44 has a mold cavity 50 of generally inverted U-shape formed in its face and configured to one-half the external shape of the trap taken along the medial axial plane of its arcuate portion. Referring to FIG. 4, each mold cavity 50 includes semi-cylindrical access openings 52, 54 extending from the legs of the inverted U to the lower edges of the respective die members 44. These openings are designed to receive blow pipes 56, 58 which are adapted to be raised and lowered on the press. In raised position the pipes close the opposite ends of mold cavity 50 during the molding operation.

Blow pipes 56, 58 are reciprocably supported in base block 60 mounted on the extrusion press, and a pneumatic actuator 62 is provided to raise and lower the pipes simultan-eously into and out of position for reception in access openings 52,54 in die members 44. Either one or both of the blow pipes may be provided with an axial bore 64 which communicates with a duct 66 (FIG. 2) in base block 60 to which tubing 68 is connected for supplying air pressure internally of the parison.

For reasons which will be apparent presently, die members 44 and their associated parts including blow pipes 56, 58, base block 60 and actuator 62 are disposed for translational movement from a position directly below extruder head 34 to one where it is positioned laterally, i.e. as viewed in FIG. 6, of the head and on-coming parison. The purpose of this is to make possible the uninterrupted extrusion of parison 42.

In the method of production employed, the advancing lower open end of parison 42 is extruded downwardly between die members 44 which at this stage are spaced apart on slides 48, as seen in FIGS. 2 and 4. Blow pipes 56, 58 are in elevated position and the parison is of a diameter slightly greater than the distance between the opposite outer surfaces of the blow pipes so as to permit the parison to slide down over the pipes. The taper on the upper ends of the pipes which form the tapered internal annular seat 25 of the finished trap helps to guide the on-coming end of the parison and prevent hang-up, eliminating the need to form a parison of diameter substantially greater than the width of the finished trap, thus avoiding excess waste in the form of flash about the trap as molded. As the lower edge of parison 42 reaches the level of base block 60, die members 44 are closed on slides 48 by operation of toggles 47, squeezing the tubular parison to flatten its walls together except in the region of the mold cavity and around the blow pipes. During this operation, air is admitted through ducts 68 to the blow pipes, and through either or both of them by ducts 64 to the interior of the parison to cause the walls of the parison to be continuously expanded against the surfaces of mold cavity 50 until the plastic has had time to cool and rigidify.

With die members 44 clamped in closed position, the die assembly is then shifted laterally of the extruder head 34, as seen in FIG. 6 along transverse slides 65 provided for this purpose on the extrusion press. In moving to this lateral position, parison 42 is drawn across a cut-off device which in this instance is shown as a heated wire 70 (see FIGS. 2 and 6) stretched across the path of movement of the die, slightly above the upper surface thereof. This cuts the clamped, molded lower portion of the parison from the upper tubular sleeve, freeing the on-coming open end for reception of the blow pipes in the next cycle of operation.

After sufficient cooling of the molded part has occurred to cause it to be substantially rigidified and self-supporting, die members 44 are separated, and the molded part which is then supported on blow pipes 56, 58 is stripped and ejected by retracting the pipes into the block 60. The product at this point is shown in FIG. 7 in which the trap 12 is surrounded by flash 72. The finished trap is prepared by breaking or cutting away this flash. If dies 44 are properly designated to provide appropriate pinch-off ridges around the contour of the trap, the finished trap may be readily broken free of the flash and is ready for immediate use.

It will be noted that the method of blow molding described above makes use of the blow pipes not only to introduce pressure into the parison to expand it into the mold cavity, but also as a semicore member to form the interior surface of the trap at each of its ends. These surfaces, which are designed to receive the coupling duct members and to form a fluid and gas-tight joint with them, are thus pre-finished and no secondary finishing operation is needed. The use of the blow pipes in this manner also makes it possible in a blow molding process to change the wall thickness of the molded part, something which is ordinarily not readily possible. For example, as seen in FIG. 8, the wall thickness in the area of threads 24 of the trap is substantially greater than in the bend 12, for example, and this of course is desired to prevent weakness in the thread area of the trap. The order of difference in thickness for example which is made possible by the method described may be typically as much as three-to-one; i.e., the wall of the bend section 18 may be on the order of 0.08 inch while in the thread section 24 the total thickness from thread crest to inner wall surface may be 0.250 inch.

The same method described above may also be employed in forming waste bend 14 by appropriate die design. One example is illustrated in FIG. 9 which represents a molded product consisting of two waste bends 14 and an extension tube 15 interconnected by flash 72 so arranged as to make more efficient use of material. In this instance, blow pipes are not used and instead an inflation needle is run through an access opening of the die when it is closed to clamp the parison as above described, and the needle penetrates the parison within the mold cavity. Air pressure is then supplied through the needle to expand the clamped parison against the surfaces of the mold cavity. After the plastic has cooled sufficiently to rigidify the molded part, the dies are separated and the inflation needle is withdrawn, ejecting the part from the press. In the design of the molded product shown in FIG. 9, the cluster of two waste bends 14 and an extension tube 15 can be broken free of flash 72 but a secondary cutting operation is then necessary to separate the individual bends and to cut off the closure 74 formed at each of the long ends of the tubes.

An alternate method of producing traps 12 is illustrated in FIG. 10 which represents the molded product resulting from blow molding a parison extruded as before between a pair of dies machined to provide the generally eliptical toroid shaped mold cavity arrangement producing two traps in end-to-end position. As in the above-described method of forming bends 14, this method of producing traps 12 makes use of an inflation needle inserted through the parison at a point corresponding to a scrap area of the as-molded product; for example, in the short tubular connectors 74 between the complementary traps 12. The hole 76 left in connectors 74 by the needles thus does not affect the finished traps which again must be cut apart in a secondary operation after breaking off the flash 72.

The method of the invention makes possible the production in plastic of such products as an antisyphon trap illustrated in FIG. 11. A product such as this having different diameters along the tubular axis cannot be made at all by injection molding.

The plastic resin employed will of course be determined largely by the product use. Thermoplastic materials such as polystyrene, polypropylene and A.B.S. (acrylo-nitrile-butadiene-styrene) are particularly suitable for most purposes.

What is claimed is:

1. A tubular article of manufacture having an arcuate portion along its tubular axis produced by the method of
   a. extruding a tubular parison of heated thermoplastic resin and clamping said parison while still pliable between mating die members having cooperating mold cavities configured to the external shape of the article to be formed, said die members being partable along an axial plane of the article coincident with the axial plane of its arcuate portion;
   b. introducing a blow-molding duct into said die members and parison to provide communication internally of said plastic parison at a point adjacent an end of the tubular article to be formed, and introducing fluid under pressure through said duct while said parison is clamped between the closed die members in order to force the parison wall outwardly into contact with the surfaces of said mold cavities until the plastic has cooled sufficiently to rigidify; then
   c. parting said die members and stripping the molded tubular article from the die cavities
   said article, resulting as aforesaid from extruding a tubular parison of heated thermoplastic polymerized resin, being rigid and integrally formed with said arcuate portion along its tubular axis.

2. An integrally molded, rigid plastic, tubular article of manufacture as defined in claim 1, wherein said article comprises a plumbing J-tube having integrally formed threads in the wall of said tube at each of its opposite ends.

3. An integrally molded, rigid plastic, J-tube as defined in claim 2, wherein the wall of the tube in the thread area is of greater overall thickness than in the rest of the tube.

4. An integrally molded, rigid plastic, tubular article as defined in claim 1, wherein said article includes a linear portion along its tubular axis.

5. An integrally molded, rigid plastic, tubular article as defined in claim 4, wherein the linear portion is formed at an end of the arcuate portion and is tangential thereto.

6. An integrally molded, rigid plastic, tubular article as defined in claim 4, wherein the arcuate portion defines a bend of at least 180°.

* * * * *